US006565223B2

(12) United States Patent
Liao et al.

(10) Patent No.: US 6,565,223 B2
(45) Date of Patent: May 20, 2003

(54) INTEGRATED LIGHT TRANSFER STRUCTURE FOR PROVIDING HALO AND END ILLUMINATION FOR A CONTROL SWITCH ASSEMBLY

(75) Inventors: Shangshyan S. Liao, Ann Arbor, MI (US); Erik Steven Rickel, Westland, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 9 days.

(21) Appl. No.: 09/769,825

(22) Filed: Jan. 24, 2001

(65) Prior Publication Data

US 2002/0097569 A1 Jul. 25, 2002

(51) Int. Cl.[7] ................................................ G01D 11/28

(52) U.S. Cl. ........................... 362/26; 362/30; 362/100; 200/317; 200/316; 116/287

(58) Field of Search .............................. 362/26, 27, 30, 362/31, 555, 100, 84, 85, 331, 394, 800; 200/310, 312, 313, 314, 316, 317; 116/286, 287, 288

(56) References Cited

U.S. PATENT DOCUMENTS

| | | | | |
|---|---|---|---|---|
| 2,693,165 A | * | 11/1954 | Appleman | 116/310 |
| 2,831,453 A | * | 4/1958 | Hardesty | 116/288 |
| 3,636,915 A | | 1/1972 | Ruppert | |
| 4,163,883 A | | 8/1979 | Boulanger | |
| 4,549,050 A | | 10/1985 | Lang | |
| 4,583,151 A | | 4/1986 | Nagel | |
| 4,778,966 A | | 10/1988 | Obata | |
| 5,093,764 A | * | 3/1992 | Hasegawa et al. | 116/202 |
| 5,359,165 A | | 10/1994 | Leveque | |
| 5,697,689 A | | 12/1997 | Levine | |
| 5,878,870 A | | 3/1999 | Ohtaki | |
| 5,901,836 A | | 5/1999 | Taniuchi | |
| 6,224,221 B1 | * | 5/2001 | Glienicke | 116/286 |

* cited by examiner

*Primary Examiner*—Sandra O'Shea
*Assistant Examiner*—Hargobind S. Sawhney
(74) *Attorney, Agent, or Firm*—Brinks Hofer Gilson & Lione

(57) ABSTRACT

An illuminated control assembly which comprises a light guide having a an outer illumination section and an end illumination section. The assembly also comprises at least one outer light conducting leg and at least one end light conducting leg. Each leg has a light receiving portion proximate to light source and distanced from the illumination sections. Each leg also has a light delivering portion, wherein the light delivering portion of the outer light conducting leg is in light communication with the outer illumination section and the light delivering portion of the end light conducting leg is in light communication with the end illumination section. The assembly also comprises a control member having a light duct. The control member is connected to an input receiver and the control member is in light communication with the end illumination section wherein light from the end illumination section is transmitted through the light duct.

12 Claims, 3 Drawing Sheets

INTEGRATED LIGHT TRANSFER STRUCTURE FOR PROVIDING HALO AND END ILLUMINATION FOR A CONTROL SWITCH ASSEMBLY

BACKGROUND OF THE INVENTION

The present invention generally relates to illuminated control switches utilizing light transfer structures for illumination. In particular, the present invention relates to an integrated light guide for providing halo and switch end illumination to an unbounded rotary control switch such as a fan control switch in an automobile.

It is desirable for a control switch to be illuminated where the control switch is operated in a poorly lit or dark environment. Such environments include control switches on the instrument panel of an automobile when driving at night. Illumination of a control switch in a dark environment can provide a user with the ability to quickly locate and identify the desired control switch function. Halo illumination, or illumination, for example, around the circumference of a circular knob, assists the user in finding the general location and size of a control switch. End illumination, or illumination, for example, of a graphic representing a function at the end of the control switch, provides the user with an efficient manner to identify the function of a control switch in the dark.

Current control switches commonly do not possess both halo and end illumination. Manufactures may provide an illuminated graphic near a control switch to identify function and location of the switch, but a function graphic on the knob itself is typically not illuminated. Some existing control switches provide halo and end illumination, however, these switches require the light source to be physically close to the illuminated surfaces of the control switch. The presence of these light sources can limit the design and function of the switch and make the switch complex and expensive to manufacture. Some other existing control switches use light guides, or other light transferring devices, to transmit light to the sides or end of a control switch. These devices, however, require a complex design which can limit the function of the knob, increase the cost of manufacture, and present issues of limited durability.

BRIEF SUMMARY OF THE INVENTION

The present invention addresses the above problems by providing an integrated light transfer structure for use with a control switch which supplies both halo and end illumination. An advantage of the preferred embodiment of the present invention is that it provides halo and end illumination utilizing a light guide that is simple to manufacture and assemble.

In accordance with one aspect of the present invention, an illuminated control assembly is provided that includes a light guide. The light guide comprises an outer illumination section and an end illumination section integral with the outer illumination section. The illuminated control assembly also comprises at least one outer light conducting leg. The outer light conducting leg has a light receiving portion and a light delivering portion. The light delivering portion is in light communication with the outer illumination section and the light receiving portion is proximate to a light source distanced from the outer illumination section. The illuminated control assembly also comprises at least one end light conducting leg. The end light conducting leg has a light receiving portion and a light delivering portion. The light delivering portion is in light communication with the end illumination section and the light receiving portion is proximate to a light source and distanced from the end illumination section. The illuminated control assembly also comprises a control member having a light duct. The control member is linked to an input receiver and is mounted in light communication with the end illumination section of the light guide member such that light from the end illumination section is transmitted through the light duct.

Another aspect of the present invention includes a light guide which comprises an outer illumination section having a plurality of light conducting legs extending therefrom. Each of the legs have a light receiving portion and a light delivering portion. The light delivering portions are integral with the outer illumination section and the light receiving portions are distanced from the outer illumination section. Light receiving faces are defined on the light receiving portions. The light guide further comprises an end illumination section integral with the outer illumination section. The end illumination section has a plurality of light conducting legs extending therefrom. Each of the legs have a light receiving portion and a light delivering portion. The light delivering portions are integral with the end illumination section and the light receiving portions are distanced from the end illumination section. Light receiving faces are defined on the light receiving portions.

In accordance with yet another aspect of the present invention, an illuminated control assembly is provided that includes a light guide. The light guide comprises an end illumination section and at least one light conducting leg. The light conducting leg has a light receiving portion and a light delivering portion. The light receiving portion is proximate to a light source and distanced from the light delivering portion. The end illumination section and light delivering portion are in light communication. The illuminated control assembly also comprises a rotatable control member having a light duct. The control member is rotatably mounted axially over the end illumination section of the light guide member in light communication with the light guide member such that light from the end illumination section is transmitted through the light duct. The rotatable control member is continuously rotatable about said end illumination section of said light guide member.

Advantages of the present invention will become readily apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE PREFERRED EMBODIMENTS OF THE INVENTION

Figure 1:
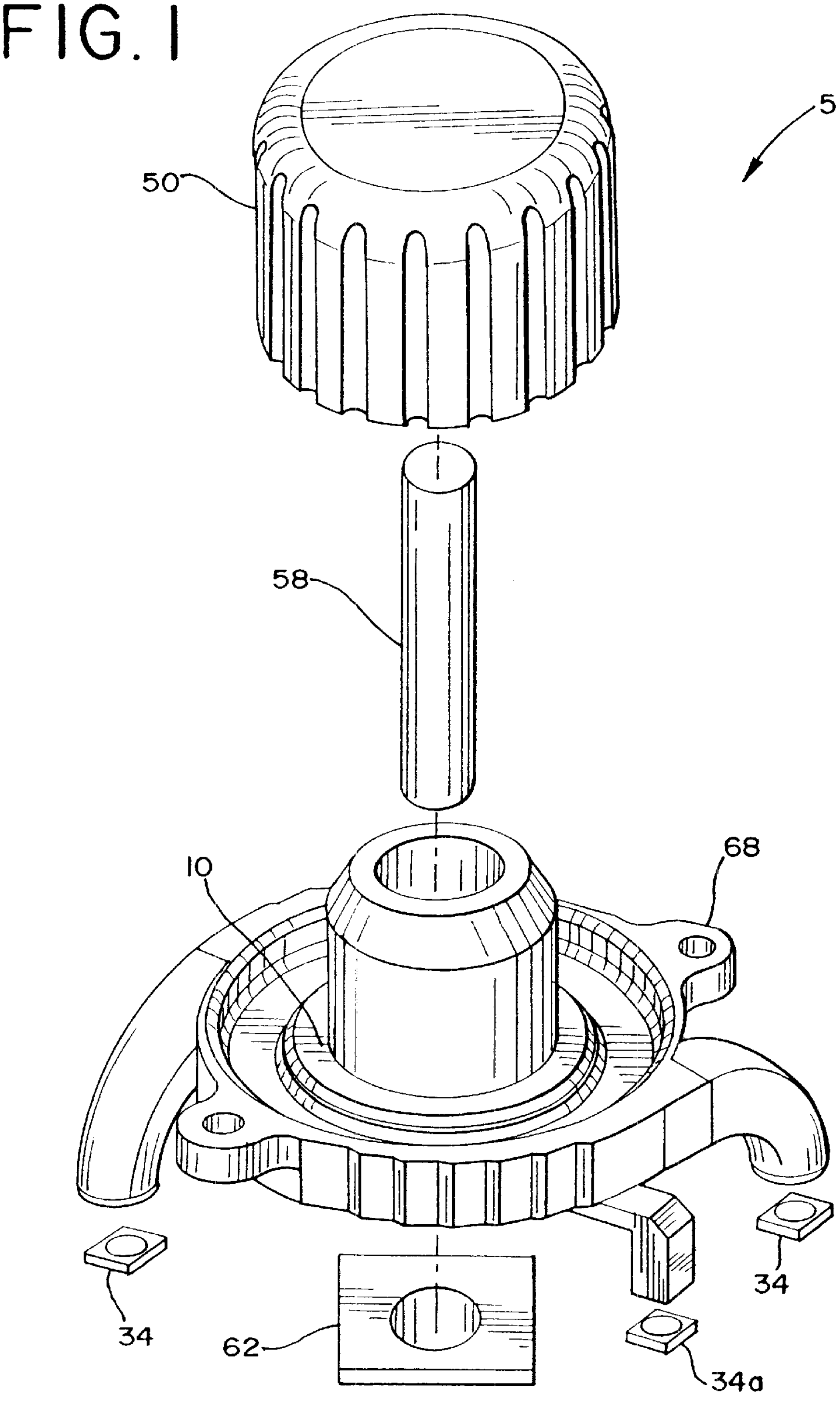
FIG. 1 is a perspective exploded view of an illuminated control assembly utilizing the present invention.

FIG. 1 and FIGS. 4–7 show an illuminated control assembly 5 having combined halo and knob end illumination. In the preferred embodiment, the illuminated control assembly 5 generally comprises a light guide 10, a control member 50, a shaft 58 and an input receiver 62. The light guide 10 is fixedly connected with a control panel [not shown] at an attachment section 68. The control member 50 is disposed over the light guide 10 and is fixedly connected with a shaft 58, which, in turn, is rotably and axially connected with an input receiver 62. A light source 34, 34*a* provides the illumination for the illuminated control assembly 5. This light source 34, 34*a* is preferably one or more LED's, however, other apparatus for providing illumination may be used such as incandescent lamps.

The light guide 10 of the preferred embodiment is generally cylindrical having concentric circular sections. The light guide 10 is made of a clear polymer having optical transmission properties and is preferably made of acrylic. The light guide 10 is preferably fabricated in one piece having integral sections, although it is contemplated that the light guide 10 may be an assembly of separate pieces.

Figure 2:
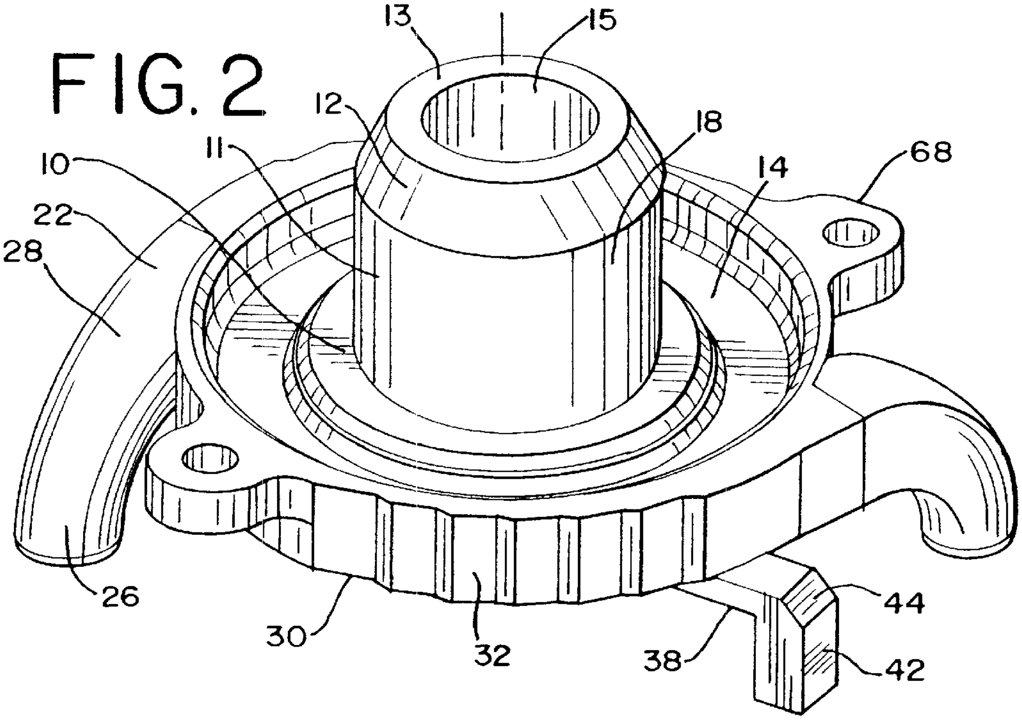
FIG. 2 is a perspective view of the front of a first embodiment of a light guide of the present invention.
Figure 3:
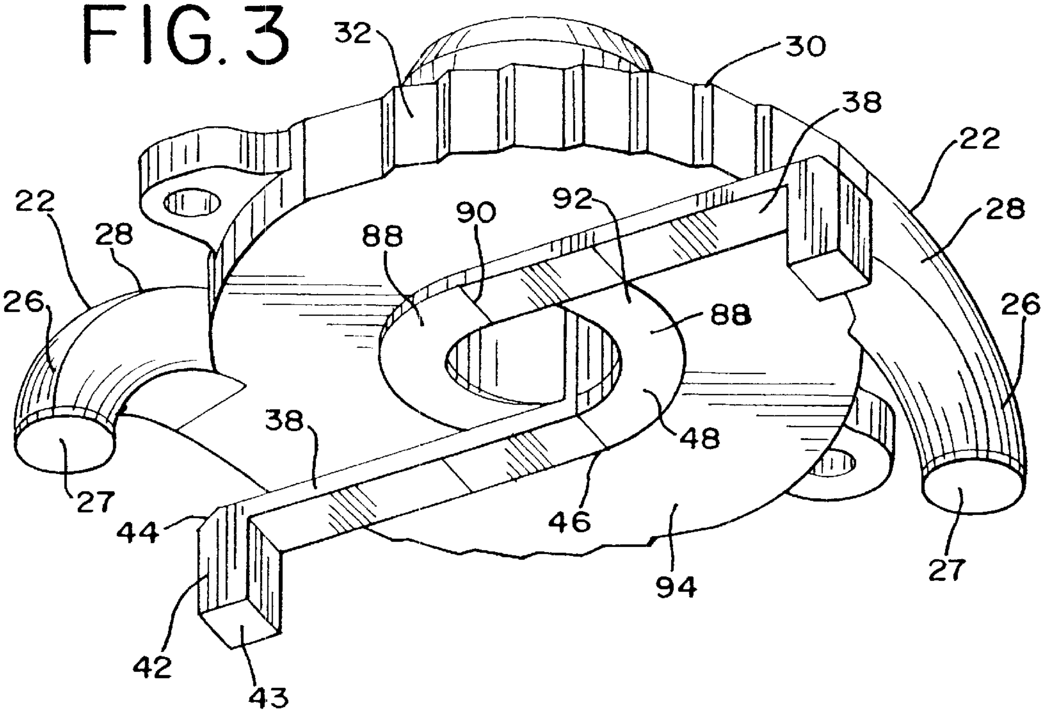
FIG. 3 is a perspective view of the back of the light guide shown in FIG. 2.
Figure 4:
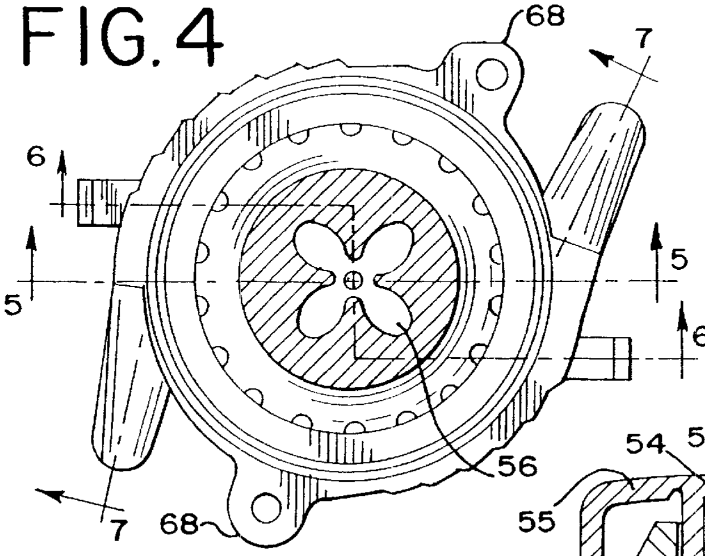
FIG. 4 is a plan view of the illuminated control assembly utilizing the present invention shown in FIG. 1.

As shown in FIGS. 2 and 3, the light guide 10 comprises an outer illumination section 14 and an end illumination section 18. In the preferred embodiment, the outer illumination section 14 provides circumferential halo lighting and the end illumination section 18 provides lighting to a function graphic 56 at the end of the control member 50. As shown in FIG. 4, a function graphic 56 may be a symbol, such as a fan symbol on an automobile, which is visible through a contrast in color between an opaquely masked surface of the control knob 50 and an unmasked area of the light duct 54 in the shape of the desired function symbol. A contrast between a dark or black masking against a white light duct 54 creates visual identification of the function graphic during daytime and during nighttime when the present invention is illuminated.

Referring to FIGS. 2 and 3, The outer illumination section 14 is preferably annular and defines a substantially planar surface. The outer illumination section 14 is suitably sized to be larger than the diameter of the control member 50 such that light from the outer illumination section 14 is visible when the illuminated control assembly 5 is in operation. At least one outer light conducting leg 22 is connected with the outer illumination section 14 for transmitting light from a distanced light source 34. As shown in FIG. 3, the preferred embodiment defines two outer light conducting legs 22 extending tangentially and located 180° apart along the circumference of the outer illumination section 14. Although a different number of legs 22 may be utilized, two outer light conducting legs 22 provide efficient uniform illumination to the outer illumination section 14.

An outer light receiving portion 26 is directed substantially 90° axially from the outer illumination section 14 and receives light from a light source 34. A separate light source 34 is preferably utilized for each outer light conducting leg 22. The outer light receiving portion defines an outer light receiving face 27 in light communication with the light source 34. Proximate to the outer light receiving face 27 on the outer light conducting leg 22 is an outer light redirecting section 28. The outer light redirecting section 28 turns substantially 90° in a curved fashion in relation to the outer light receiving face 27 to tangentially align with the outer illumination section 14. The curvature of the outer light redirecting section 28 redirects light to the outer light delivering portion 30 in a diffused manner, eliminating hot spots of focused light. Less focused light provides a softer visual effect, an effect desirable for halo illumination. The outer light delivering portion 30 defines a plurality of outer light redirecting faces 32 which are in light communication with the outer illumination section 14. The outer light redirecting faces 32 are angled with respect to the outer light receiving portion 26 so that light entering the outer light delivering portion 30 is redirected into the outer illumination section 18 and 360° of the outer illumination section 14 is substantially uniformly illuminated. In the preferred embodiment, the plurality of outer light redirecting faces 32 are disposed circumferentially around the outer light illumination section 14. The outer light redirecting faces 32 redirect light at various angles into the outer illumination section 14 creating uniform distribution of light which is visible during operation of the illuminated switch assembly 5.

The light guide 10 also defines an end illumination section 18 for transmitting light to the end of the control member 50. In the preferred embodiment, the end illumination section 18 is disposed within the center of the outer illumination section 14. The end illumination section comprises a column 11 extending axially from the outer illumination section 14 wherein the column 11 defines a taper 12 and end ring 13 at its terminal end. The taper 12 is adapted to divert light within the end illumination section 18 to the end ring 13. The end illumination section 18 defines an axial passageway 15 which is suitably sized to receive the shaft 58 of the control member 50 and allow rotable motion therein. The end illumination section 18 is suitably sized to provide an axial clearance between the end ring 13 and control member 50 to accommodate axial motion of the control member 50.

At least one end light conducting leg 38 is connected with the end illumination section 18 for transmitting light from a distanced light source 34*a*. As shown in FIG. 3, the preferred embodiment defines two end light conducting legs 38 extending tangentially and located 180° along the annular-cross section of the column 11. An end light conducting leg 38 comprises an end light receiving portion 42 for receiving light from the light source 34*a*. The end light receiving portion 42 further comprises an end light receiving face 43 in light communication with the light source 34*a*. An end light redirecting face 44 is further defined within the end light conducting leg 38. The end light redirecting face 44 is disposed at a substantially 45° angle with respect to the end light receiving face 43 so that light entering the end light receiving face 43 is redirected toward the end light delivering portion 46 of the conducting leg 38.

The end light delivering portion 46 defines a substantially annular end light redirecting section 48. The redirecting section 48 redirects light from the end light delivering portion 46 to the end illumination section 18. In the preferred embodiment, the end light redirecting section 48 defines two inclined torodial surfaces 88 that transition over a substantially 180° curve from a radial plane 90 to a beveled annular portion 92. The torodial surfaces incline so as to terminate planar with the surface 94 of the outer illumination section 14 before contacting the opposing end light conducting leg 38. By terminating prior to the end light conducting leg 38, light is not directed at an undesirable angle into the end light conducting leg 38 which can result in non-uniform illumination of the halo and end areas. Instead, the incline and bevel of the light redirecting section 48 redirects light in a diffused manner toward the end illumination section 18. The diffused light minimizes hot spots of focused light at the end ring 13 and provides 360° of substantially uniform intensity light at the end ring 13.

As noted above, the illuminated control assembly 5 also comprises a control member 50. In the embodiment described in FIG. 1 and FIGS. 4–7, the control member 50 preferably is a rotary knob that is generally cylindrically shaped and comprises a cap section 55 and a gripping section 57. The control member 50 also comprises a cylindrical receiving stem 59 defined concentrically within the gripping section 57 of the control member 50. The receiving stem 59 is adapted to receive the shaft 58 wherein rotary and axial motion of the control member 50 transmits rotary and axial motion to the shaft 58.

Figure 5:
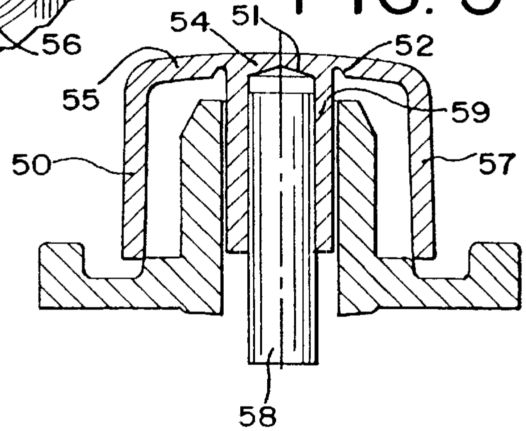
FIG. 5 is a cross-sectional view of the illuminated control assembly utilizing the present invention of FIG. 4 taken along line 5—5.
Figure 6:
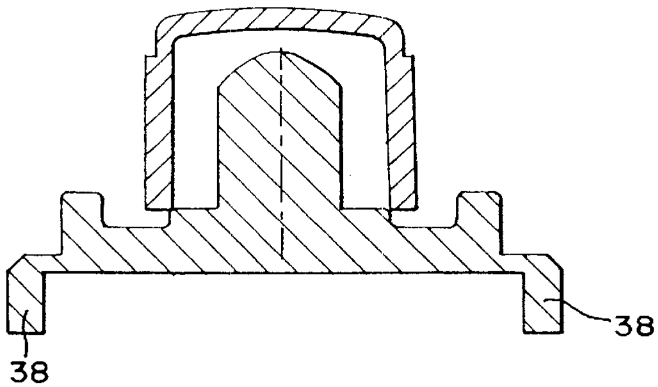
FIG. 6 is a cross-sectional view of the illuminated control assembly utilizing the present invention of FIG. 4 taken along line 6—6.
Figure 7:
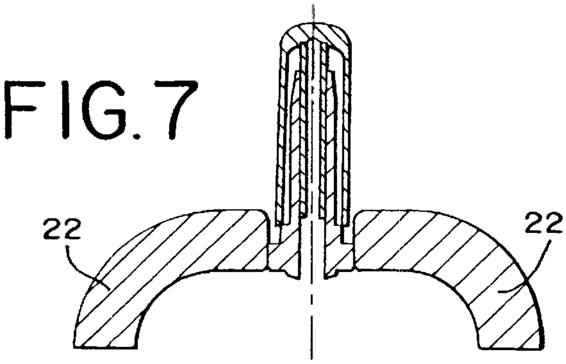
FIG. 7 is a cross-sectional view of the illuminated control assembly utilizing the present invention of FIG. 4 taken along line 7—7.

As shown in FIG. 5, the cap section 55 comprises a light redirecting facet 52 and a light duct 54 having a light redirecting surface 51. The light duct 54 defines a generally cylindrical section having light transmitting properties located centrally within the cap section 55. Preferably, the light duct 54 is a translucent or transparent polymer. The light redirecting facet 52 is preferably a conical light reflective surface that defines a 450 angle in relation to the end ring 13 wherein light transmitted from the end ring 13 of the end illumination section 18 is redirected by the light redirecting facet 52 to the light redirecting surface 51 through the light duct 54. The light redirecting surface 51 is preferably a conical reflective surface having a gradual incline wherein light transmitted from the light redirecting surface 51 is redirected in a diffused manner in a substantially axial direction through the light duct 54.

As mentioned above, the control member 50 is connected to an input receiver 62 through a shaft 58. The shaft 58 transmits rotary and axial motion from the control member 50 to the input receiver 62. The shaft 58 is preferably cylindrically shaped and is suitably sized to rotate freely within the axial passageway 15. Although the shaft 58 may be made of a metallic material, the shaft 58 is preferably made of a transparent or translucent polymer. It has been found that a shaft 58 of translucent or transparent polymer promotes light transmission through the illuminated control assembly 5.

The shaft 58 is connected with the input receiver 62 which interprets motion of the control member 50 to perform a desired function. For example, where the illuminated control assembly 5 is a heating and ventilation fan control knob (as shown in FIG. 4), rotation of the control member 50 will increase or decrease fan speed. Further, the input receiver 62 may be adapted to accept axial motion input from the control member 50 to turn the fan on or off.

In operation of the preferred embodiment, four light sources 34, 34*a* (only three shown) provide illumination to the control assembly 5. With regard to halo illumination, light enters the outer light conducting legs 22 at the outer light receiving section 26 through the outer light receiving face 27. Light is then diffusedly redirected by the outer light redirecting section 28 90° to the outer light delivering portion 30. The circumferentially located outer light redirecting faces 32 of the outer light delivering portion 30 redirect light into the outer illumination section 14 wherein 360° of uniform halo illumination is provided.

Simultaneously, light enters the end light conducting leg 38 at the end light receiving portion 42 through the end light receiving face 43. Light is then redirected by the end light redirecting face 44 90° to the end light delivering portion 46. Light is then diffusedly redirected substantially 90° by the end light redirecting section 48 into the end illumination section 18, providing 360° of uniform light at the end ring 13. Light is then transmitted from the end illumination section 18 to the light redirecting facet 52 of the control member 50. The light is redirected 900 by the light redirecting facet 52 to the light duct 54. Light is again diffusedly redirected by the light redirecting surface 51 in a substantially axial direction through the light duct 54. The function graphic 56 is then illuminated.

The preferred embodiment of the present invention provides continuous illumination at the end of the control member 50 regardless of the position of the control member 50. Illuminated switch positions are therefore available around the entire 360° perimeter of the control member 50. Additionally, as in the case of a potentiometer control switch where only clockwise and counter-clockwise motion is measured, the present invention allows for continuous illuminated unbounded rotation of the control member 50.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. An illuminated control assembly comprising:

a light guide comprising an outer illumination section and an end illumination section integral with the outer illumination section;

at least one outer light conducting leg having a light receiving portion and a light delivering portion, said light delivering portion being in light communication with the outer illumination section and said light receiving portion being proximate to a light source distanced from the outer illumination section;

at least one end light conducting leg having a light receiving portion and a light delivering portion, said light delivering portion being in light communication with the end illumination section, said light receiving portion being proximate to a light source and distanced from the end illumination section;

a control member having a light duct, said control member being linked to an input receiver and being mounted in light communication with said end illumination section of said light guide member such that light from the end illumination section is transmitted through said light duct.

2. The illuminated control assembly of claim 1, wherein said light guide does not move in response to movement of the control member.

3. The illuminated control assembly of claim 1, wherein the control member is continuously rotable.

4. The illuminated control assembly of claim 1, wherein said light guide comprises two end light conducting legs.

5. The illuminated control assembly of claim 1, wherein said light guide comprises two outer light conducting legs.

6. The illuminated control assembly of claim 1, wherein the light source is a light emitting diode.

7. A light guide comprising:

an outer illumination section having a plurality of light conducting legs extending therefrom, each of said legs having a light receiving portion and a light delivering portion, said light delivering portions being integral with said outer illumination section and said light receiving portions being distanced from the outer illumination section and having light receiving faces defined on said light receiving portions; and an end illumination section integral with the outer illumination section, said end illumination section having a plurality of light conducting legs extending therefrom, each of said legs having a light receiving portion and a light delivering portion, said light delivering portions being integral with the end illumination section and said light receiving portions being distanced from the end illumination section and having light receiving faces defined on said light receiving portions.

8. The light guide of claim 7 wherein said legs being positionable adjacent to a light source.

9. The light guide of claim 8 wherein the light source is a light emitting diode.

10. The light guide of claim 7 wherein said outer illumination section comprises light conducting legs.

11. The light guide of claim 7 wherein said end illumination section comprises two light conducting legs.

12. An illuminated control assembly comprising:

a light guide comprising an end illumination section and at least one light conducting leg having a light receiving portion and a light delivering portion, said light receiving portion being proximate to a light source and distanced from the light delivering portion, said end illumination section and light delivering portion being in light communication, said light guide further comprising an outer illumination section and at least one light conducting leg having a light receiving portion and a light delivering portion, said light receiving portion being proximate to a light source and distanced from the light delivering portion, said outer illumination section and light delivering portion being in light communication; and a rotatable control member having a light duct, said control member being rotatably mounted axially over the end illumination section of said light guide member in light communication with said light guide member such that light from the end illumination section is transmitted through said light duct;

wherein said rotatable control member is continuously rotatable about said end illumination section of said light guide member.

* * * * *